(12) United States Patent
Knapczyk, II

(10) Patent No.: US 11,280,380 B2
(45) Date of Patent: Mar. 22, 2022

(54) MAGNETORHEOLOGICAL HYDRAULIC DAMPER WITH PASSIVE DAMPING CHAMBER

(71) Applicant: BeijingWest Industries Co., Ltd., Beijing (CN)

(72) Inventor: Marcin Knapczyk, II, Cracow (PL)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 107 days.

(21) Appl. No.: 16/891,038

(22) Filed: Jun. 2, 2020

(65) Prior Publication Data

US 2021/0033165 A1   Feb. 4, 2021

(30) Foreign Application Priority Data

Aug. 2, 2019   (CN) .......................... 201910710312.4

(51) Int. Cl.
*F16F 9/53*       (2006.01)
*F16F 9/06*       (2006.01)
(Continued)

(52) U.S. Cl.
CPC .............. *F16F 9/535* (2013.01); *F16F 9/062* (2013.01); *F16F 9/063* (2013.01); *F16F 9/065* (2013.01);
(Continued)

(58) Field of Classification Search
CPC .. F16F 9/062; F16F 9/065; F16F 9/067; F16F 9/34; F16F 9/44; F16F 9/53; F16F 9/535
(Continued)

(56) References Cited

U.S. PATENT DOCUMENTS

| 5,161,653 A | 11/1992 | Hare, Sr. |
| 6,360,856 B1 | 3/2002 | Koh |

(Continued)

FOREIGN PATENT DOCUMENTS

| CN | 107956835 A | 4/2018 |
| DE | 1240340 B | 5/1967 |

(Continued)

OTHER PUBLICATIONS

Extended European Search Report dated Dec. 22, 2020 for counterpart European patent application No. 20185905.5.

*Primary Examiner* — Christopher P Schwartz
(74) *Attorney, Agent, or Firm* — William H. Honaker; Dickinson Wright PLLC

(57) ABSTRACT

A damper assembly comprises a main tube extending along a center axis defining a fluid chamber. A main piston is located in the main tube dividing the fluid chamber into a compression chamber and a rebound chamber. A piston rod extends into the main tube and coupled to the main piston. The piston rod defines an annular chamber extending along the center axis. A slidable partition is located in the annular chamber dividing the annular chamber into a magnetorheological chamber and a compensation chamber. A secondary piston is slidably disposed in the magnetorheological chamber dividing the magnetorheological chamber into a magnetorheological compression chamber and a magnetorheological rebound chamber. A secondary piston rod sealingly and slidably guided through the main piston and couples to the main tube for moving the secondary piston axially in the magnetorheological chamber.

20 Claims, 4 Drawing Sheets

(51) Int. Cl.
*F16F 9/32* (2006.01)
*F16F 9/34* (2006.01)
*F16F 9/43* (2006.01)
*F16F 9/58* (2006.01)
*B60G 13/08* (2006.01)
*B60G 17/08* (2006.01)

(52) U.S. Cl.
CPC ............ *F16F 9/067* (2013.01); *F16F 9/3221* (2013.01); *F16F 9/34* (2013.01); *F16F 9/43* (2013.01); *F16F 9/585* (2013.01); *B60G 13/08* (2013.01); *B60G 17/08* (2013.01); *B60G 2202/24* (2013.01); *B60G 2204/45* (2013.01); *B60G 2206/41* (2013.01); *B60G 2500/10* (2013.01); *B60G 2600/182* (2013.01); *B60G 2800/162* (2013.01); *F16F 2222/12* (2013.01); *F16F 2224/045* (2013.01); *F16F 2228/066* (2013.01); *F16F 2228/12* (2013.01); *F16F 2232/08* (2013.01); *F16F 2234/02* (2013.01)

(58) Field of Classification Search
USPC ............................ 188/267, 267.1, 267.2, 315
See application file for complete search history.

(56) References Cited

U.S. PATENT DOCUMENTS

| | | | |
|---|---|---|---|
| 9,533,542 B2 * | 1/2017 | Allen | B60G 17/06 |
| 2011/0083929 A1 * | 4/2011 | Marking | F16F 9/53 |
| | | | 188/267.2 |
| 2012/0160621 A1 | 6/2012 | Battlogg et al. | |
| 2012/0186921 A1 | 7/2012 | Battlogg et al. | |
| 2013/0341843 A1 | 12/2013 | Battlogg et al. | |
| 2014/0182984 A1 * | 7/2014 | Ito | B62K 25/08 |
| | | | 188/297 |
| 2014/0238795 A1 | 8/2014 | Hoult | |
| 2015/0165860 A1 | 6/2015 | Soles et al. | |
| 2016/0339989 A1 | 11/2016 | Walthert et al. | |

FOREIGN PATENT DOCUMENTS

| | | | | |
|---|---|---|---|---|
| DE | 102007056313 A1 | | 5/2009 | |
| EP | 2933125 A1 | | 5/2010 | |
| EP | 3499084 A1 * | | 6/2019 | ............ F16F 9/3465 |
| FR | 92212 E | | 10/1968 | |
| JP | 2008045581 A | | 2/2008 | |
| JP | 2010270832 | * | 12/2010 | ................ F16F 9/44 |

\* cited by examiner

MAGNETORHEOLOGICAL HYDRAULIC DAMPER WITH PASSIVE DAMPING CHAMBER

CROSS REFERENCE TO RELATED APPLICATION

The present application claims priority Chinese Patent Application Ser. No. CN201910710312.4, filed on Aug. 2, 2019, the entire disclosure of which is hereby incorporated herein by reference in its entirety.

BACKGROUND OF THE INVENTION

1. Field of the Invention

The present invention relates generally to a damper assembly and in particular, a damper assembly for a vehicle.

2. Description of the Prior Art

Passive dampers employing working fluid featuring constant viscosity are known to provide versatile design parameters that may be used to provide any desired characteristic of the damping force, shaped not only with respect to the velocity of the piston rod, but also with respect to high frequency and/or low amplitude events. Nonetheless the damping characteristic of passive dampers integrated into a suspension system of a motor vehicle is fixed and irresponsive to particular and ever changing road conditions that can be detected by the control systems of the vehicle and thus could be appropriately handled by the suspension system of the vehicle.

To this end active dampers, such as magnetorheological (MR) dampers filled with magnetorheological fluid controlled by magnetic field are known from the state of art. They enable changing the viscosity of the damping fluid by varying the power of the electromagnet, so that the damping characteristic can be continuously controlled. Magnetorheological fluids, however, are costly and the magnetic particles suspended within the carrier fluid greatly increase the wear and tear of the mechanical valve assemblies of the damper. Furthermore, relatively complex control systems equipped with numerous sensors are required to continuously control magnetorheological dampers, while their efficiency often remains unsatisfactory.

U.S. Pat. No. 6,360,856 discloses a hydraulic damper comprising an outer tube having a first working chamber, an inner tube located inside the first working chamber and having a second working chamber. A first piston is movably inserted into the first working chamber and a second piston comprises a coil and is movably inserted into the second working chamber. The first working chamber is filled with hydraulic fluid, while the second working chamber is filled with magnetorheological fluid.

Chinese Patent CN107956835 discloses a damper comprising a compressible hydraulic cylinder and an incompressible auxiliary cylinder. An incompressible auxiliary cylinder is divided by auxiliary piston encompassing magnetic coils and is filled with MR fluid, wherein a compressible hydraulic cylinder is divided by main piston and is filled by a molecular medium. The main piston and the auxiliary piston are mutually connected by mutual piston rod.

Similar damper construction using two different types of working fluid is also disclosed in U.S. Patent Application US2015/0165860.

SUMMARY OF THE INVENTION

The present invention to provides a damper assembly having two separate working chambers filed respectively with regular working fluid and MR fluid, which would combine advantages of both technologies in order to resolve the weaknesses of the MR dampers in order to controllably shape the desired damping characteristic within a predefined control area. Yet another object of the present invention has been to provide a damper of this kind that would be cost efficient and simple in manufacture.

It is one aspect of the present invention to provide a damper assembly. The damper assembly comprises a main tube extending along a center axis defining a fluid chamber for containing a working fluid. A main piston is located in the main tube dividing the fluid chamber into a compression chamber and a rebound chamber. A piston rod extends into the main tube through a piston rod guide and coupled to the main piston for moving the main piston between a compression stroke and a rebound stroke. The piston rod defines an annular chamber extending along the center axis. A slidable partition is located in the annular chamber dividing the annular chamber into a magnetorheological chamber and a compensation chamber. The magnetorheological chamber is proximal relative to the main piston for containing a magnetorheologial fluid. The compensation chamber is distal relative to the main piston for containing a gas. A secondary piston is slidably disposed in the magnetorheological chamber dividing the magnetorheological chamber into a magnetorheological compression chamber and a magnetorheological rebound chamber. The magnetorheological compression chamber extends between the slidable partition and the secondary piston. The magnetorheological rebound chamber extends between the secondary piston and the main piston. A secondary piston rod sealingly and slidably guided through the main piston and couples to the main tube for moving the secondary piston axially in the magnetorheological chamber.

It is another aspect of the present invention to a damper assembly. The damper assembly comprises a main tube extending along a center axis defining a fluid chamber for containing a working fluid. A main piston is located in the main tube dividing the fluid chamber into a compression chamber and a rebound chamber. A piston rod extends into the main tube through a piston rod guide and coupled to the main piston for moving the main piston between a compression stroke and a rebound stroke. The piston rod defines an annular chamber extending along the center axis. A slidable partition is located in the annular chamber dividing the annular chamber into a magnetorheological chamber and a compensation chamber. The magnetorheological chamber is proximal relative to the main piston for containing a magnetorheologial fluid. The compensation chamber is distal relative to the main piston for containing a gas. A secondary piston is slidably disposed in the magnetorheological chamber dividing the magnetorheological chamber into a magnetorheological compression chamber and a magnetorheological rebound chamber. The magnetorheological compression chamber extends between the slidable partition and the secondary piston. The magnetorheological rebound chamber extends between the secondary piston and the main piston. A secondary piston rod sealingly and slidably guided through the main piston and couples to the main tube for moving the secondary piston axially in the magnetorheological chamber. An external tube extends about the main tube defining an additional compensation chamber extending between the main tube and the external tube. A base valve is located at an end of the compression chamber. The base valve is provided with rebound and compression valves for controlling working fluid flow passing between the compression chamber and the additional compensation chamber. The secondary piston rod couples to the base valve or the external tube.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
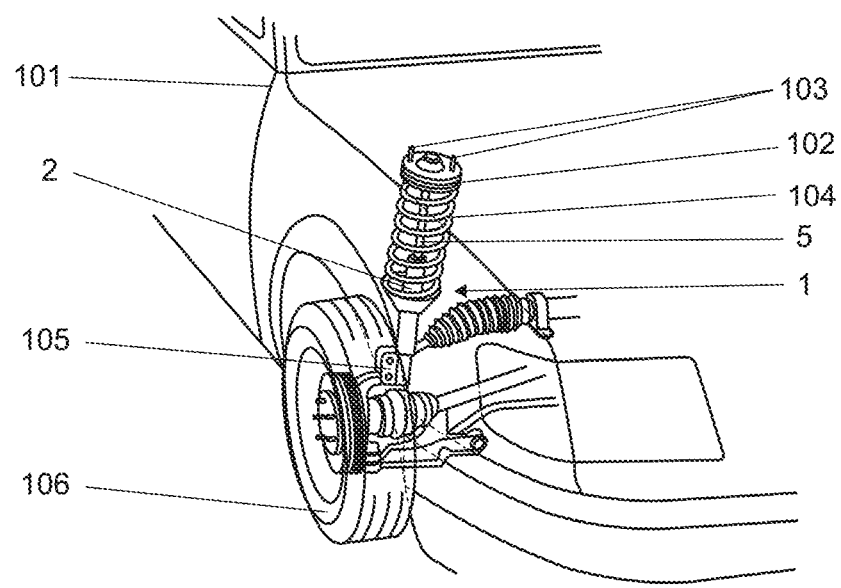
FIG. 1 illustrates a fragment of a vehicle suspension comprising a damper assembly constructed in accordance with an embodiment of the present invention.

Referring to the Figures, wherein like numerals indicate corresponding parts throughout the several views, FIG. 1 illustrates a damper assembly 1 constructed in accordance with an embodiment of the present invention coupled to a vehicle chassis 101. The damper assembly 1 can be coupled to the vehicle chassis 101 using a top mount 102 and a plurality of screws 103 wherein the plurality of screws 103 are disposed along a periphery of an upper surface of the top mount 102. The top mount 102 couples to a coil spring 104 and a piston rod 5 of the damper 1. An external tube 2 of the damper assembly 1 can be coupled to a steering knuckle 105 supporting the vehicle wheel 106.

Figure 2:
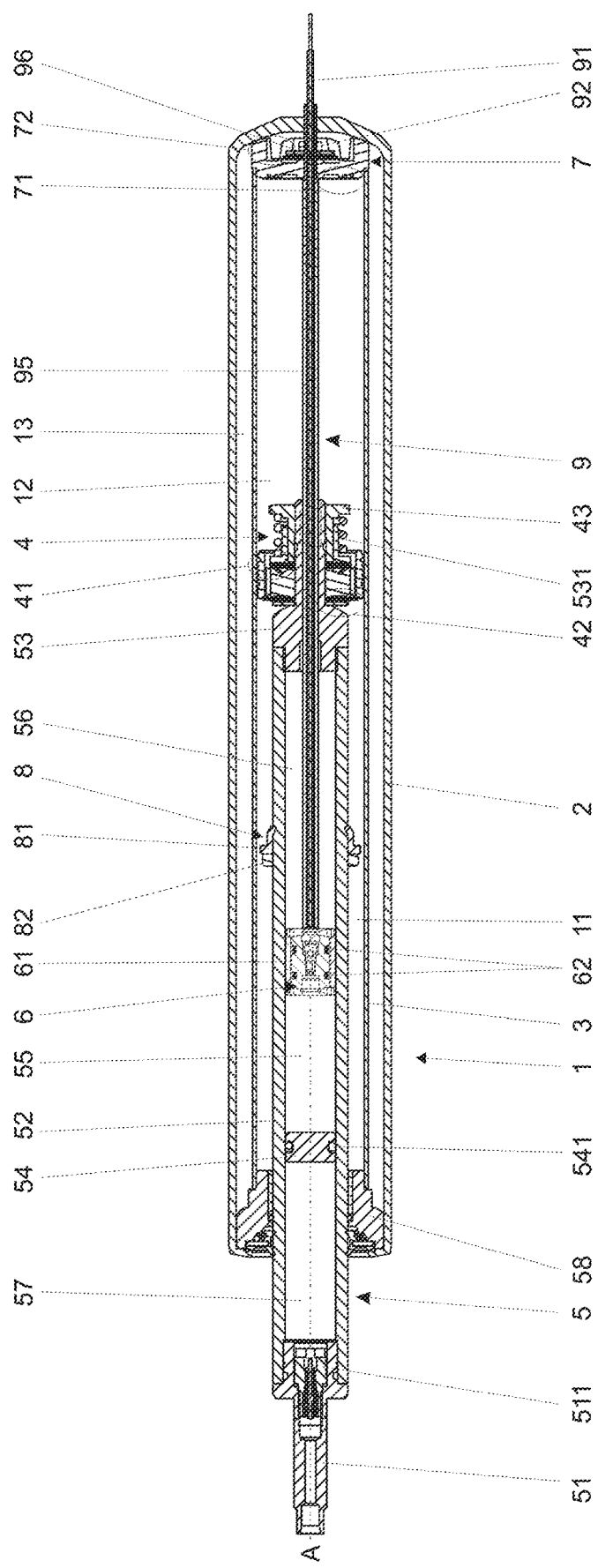
FIG. 2 is a cross-sectional view of a damper assembly constructed in accordance with an embodiment of the present invention.

FIG. 2 illustrates a twin-tube damper 1, also referred to as a damper assembly 1, constructed in accordance with an embodiment of the present invention. The damper assembly 1 comprises an external tube 2 and a main tube 3. The main tube 3 extends along a center axis A and defines a fluid chamber 11, 12 for containing a viscous working fluid. A main piston 4 located in the main tube 3 dividing the fluid chamber 11, 12 into a compression chamber 12 and a rebound chamber 11. A piston rod 5 extending into the main tube 3 through a piston rod guide 58. The piston rod guide 58 is coupled to one end of the main tube 3 wherein one end of the piston rod 5 located in the fluid chamber 11, 12 couples to the main piston 4 and another end of the piston rod 5 is located outside the damper assembly 1. The piston rod 5 moves the main piston 4 between a compression stroke and a rebound stroke.

The damper assembly 1 is also provided with a base valve 7 coupled at another end of the main tube 3. The main piston 4 makes a sliding fit with the inner surface of the main tube 3 and divides the fluid chamber 11, 12 of the main tube 3 into the rebound chamber 11 and the compression chamber 12. The rebound chamber 11 extends between the main piston 4 and the piston rod guide 58. The compression chamber 12 extends between the main piston 4 and the base valve 7. An additional compensation chamber 13 is located at the other side of the base valve 7 extend about the center axis A between the main tube 3 and the external tube 2.

According to an embodiment of the present invention, the main piston 4 can be provided with rebound and compression valves 41, 42. The rebound and compression valves 41, 42 can comprise stacks of deflectable or floating discs, optionally biased by springs, for controlling the flow of working fluid through the main piston 4 between the rebound chamber 11 and the compression chamber 12 in response to an axial movement of the main piston 4 along the center axis A. Additionally, the base valve 7 can be provided with rebound and compression valves 71, 72 for controlling the flow of working fluid passing between the additional compensation chamber 13 and the compression chamber 12, respectively, during rebound and compression stroke of the damper assembly 1. It should be appreciated that, the valves 41, 42 and 71, 72 can provide design parameters that may be used to shape desired passive characteristic of the damper 1. In this embodiment valves 41, 42 of the main piston 4 provide digressive damping characteristic indicated in FIG. 6 as "Passive."

The piston rod 5 includes an extender 53, a cylindrical body 52, and a mounting projection 51. The cylindrical body 52 extends along the center axis A and defines an annular chamber 55, 56, 57. One end of the cylindrical body 52 is located in the fluid chamber 11, 12 while another end of the cylindrical body 52 is located outside the fluid chamber 11, 12. The mounting projection 51 couples to another end of the piston rod 5 located outside the fluid chamber 11, 12 and is configured for coupling piston rod 5 to the top mount 102. The extender 53 couples to the one end of the cylindrical body 52 wherein the extender 53 connects the piston rod 5 with the main piston 4, which is secured on a threaded projection 531 of the extender 53 by a nut 43. The annular chamber 55, 56, 57 extends between the extender 53 and the mounting projection 51. A slidable partition 54, having a generally cylindrical shape and provided with a sealing 541, is disposed in the annular chamber 55, 56, 57 dividing the annular chamber 55, 56, 57 into a magnetorheological ("MR") chamber 55, 56, proximal to the main piston 4, and a compensation chamber 57, distal to the main piston 4. According to an embodiment of the present invention, the compensation chamber 57 can be in fluid communication a reservoir external with respect to the piston rod 5 and/or the main tube 3.

A secondary piston 6 is slidably disposed inside the MR chamber 55, 56, dividing the MR chamber 55, 56 into a MR compression chamber 55 and a MR rebound chamber 56. The MR compression chamber 55 is distal relative to the main piston 4 and extends between the slidable partition 54 and the secondary piston 6. The MR rebound chamber 56 is proximal relative to the main piston 4 and extends between the secondary piston 6 and the main piston 4. The secondary piston 6 couples to a secondary piston rod 9 having a cylindrical body 95. The secondary piston rod 9 is sealingly and slidably guided through the main piston 4, through the extender 53 of the piston rod 5. Further the secondary piston rod 9 passes through the compression chamber 12, the base valve 7 and the bottom of the external tube 2. The secondary piston rod 9 can be secured to the base valve 7 by a nut 92. The nut 92 can be fastened on a threaded, narrowed end of the cylindrical body 95 and abutting a washer 96 in the compensation chamber 13, thereby fixating the axial position of the secondary piston 6 with respect to the main tube 3.

According to an embodiment of the present invention, the MR chamber 55, 56 can be filled with an MR fluid. It should be appreciated that the MR fluid can be any conventional MR fluid including particles containing magnetic material such as iron or iron alloys which are suspended in the fluid. Accordingly, the viscosity of the MR fluid can be altered and controlled based on activating and controlling a magnetic field. The compensation chamber 57 can be filed with gas, such as air, under pressure to compensate for volumetric differences between the MR rebound chamber 56 and the MR compression chamber 55 caused by by the presence of the secondary piston rod 9 in the MR rebound chamber 56. To this end, in this embodiment of the present invention, the mounting projection 51 can include an inlet valve 511 in fluid communication with the compensation chamber 57 for filing the compensation chamber 57 with gas. In other embodiments of the present invention, the compensation chamber 57 may be already filed with gas at an assembly line and the damper assembly 1 ready to use may be devoid of any valve.

Figure 3:
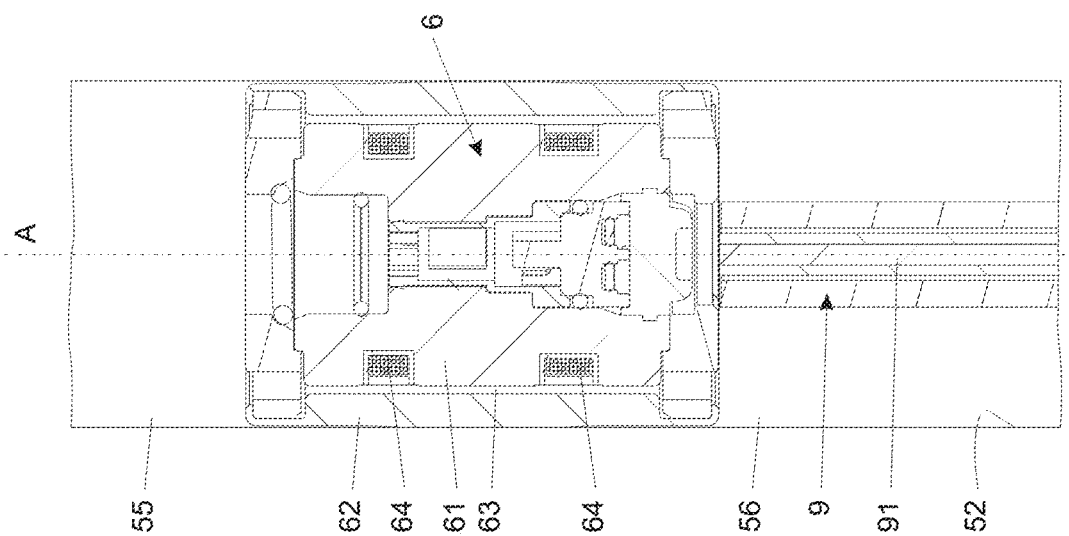
FIG. 3 is a cross-sectional view of the damper assembly including a secondary piston assembly constructed in accordance with an embodiment of the present invention.

As best illustrated in FIG. 3, the secondary piston 6 includes a body 61 housing a pair of electromagnetic coils 64 separated by an axial gap. The electromagnetic coils 64 are connected with a control cable 91 passing through the cylindrical body 95 of the secondary piston rod 9 and led outside the damper assembly 1. The control cable 91 can be electrically connected to a systems of the vehicle. A flux cylinder 62 is disposed about the body 61 to define an annular flow channel 63 between an inner annular surface of the flux cylinder 62 and an outer annular surface of the body 61 including the electromagnetic coils 64. The flux cylinder 62 is coupled at axial ends of the body 61 of the secondary piston 6 and forms a sliding fit with an inner surface of the cylindrical body 52 of the piston rod 5. In an inactive, i.e. a de-energized mode, the MR fluid may flow freely through the flow channel 63 between the MR compression chamber 55 and the MR rebound chamber 56. In an energized mode, an electrical current is provided to the electromagnetic coils 64 via the control cable 91 for variably generating a magnetic flux to modifying the viscosity and the shear resistance of the MR fluid and thereby, controlling the flow characteristics of the MR fluid passing through the flow channel 63 allowing to achieve desired damping effect for a given application.

Figure 4:
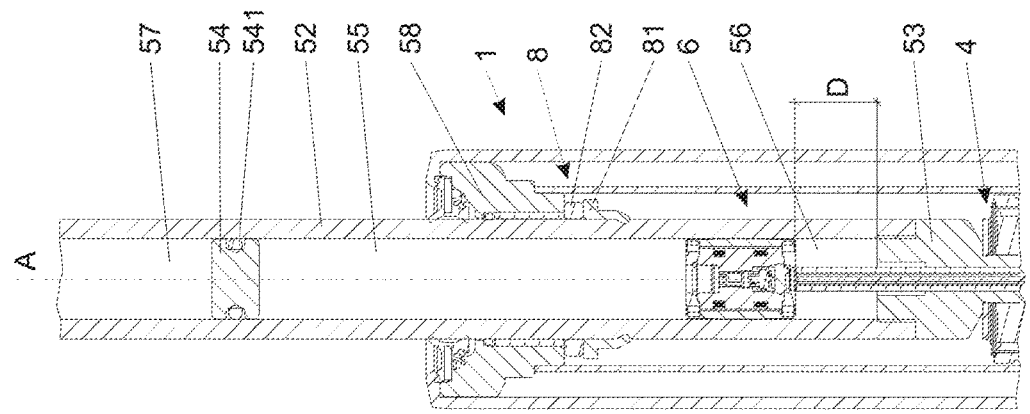
FIG. 4 is a cross-sectional view of a rebound stop assembly of the damper assembly constructed in accordance with an embodiment of the present invention.

As best illustrated in FIG. 4, the damper assembly 1 can further include a rebound stop 8 located in the rebound chamber 11 and coupled to the piston rod 5. The rebound stop 8 includes an annular collar 81 and an elastomeric ring 82 adjoining the collar 81. A radially external surface of the cylindrical body 52 of the piston rod 5 defines an annular groove extending about the center axis A for receiving the annular collar 81. The axial position of the rebound stop 8 determined in a way that a point of contact of a rebound stop engaging surface with an engagement surface, a nonzero volume of the MR rebound chamber 56 is still available. According to an embodiment of the present invention, the engaging surface can be defined as an axially external surface of the elastomeric ring 82, while the engagement surface is defined as an axially internal surface of the piston rod guide 58. Therefore, at the point of activation of the rebound stop 8 a certain distance D is still present between the secondary piston 6 and the extender 53 of the piston rod 5, thereby preventing the damaging of the secondary piston 6 and its possible abrupt detachment from the secondary piston rod 9.

Figure 5:
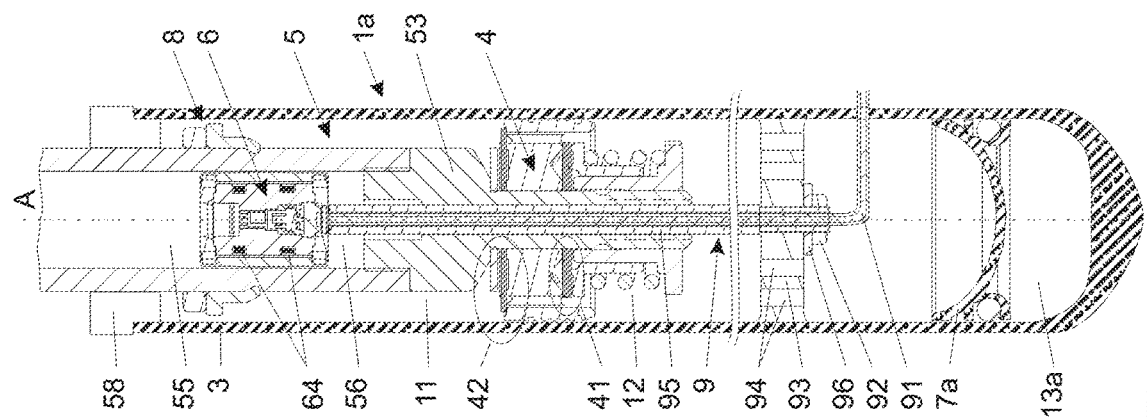
FIG. 5 is a cross-sectional view of a mono-tube damper assembly constructed according to an embodiment of the present invention.

The damper assembly 1, i.e. a mono-tube damper 1a (also referred to as the damper assembly 1a), constructed in accordance another embodiment of the present invention is illustrated in FIG. 5. Reference numerals remain the same, wherein suffix (a) was added, where appropriate, to distinct elements of the same functionality but different construction. The damper assembly 1a comprises a main tube 3 extending along a center axis A defining a fluid chamber 11, 12 for containing a working fluid. A piston rod 5 extends into the main tube 3 through a piston rod guide 58 and couples to the main piston 3 for moving the main piston 3 between a compression stroke and a rebound stroke. A gas cup 7a is located in the compression chamber 12 and adjacent to a closed end of the main tube 3 to define a gas chamber 13a extending between the closed end and the gas cup 7a for containing a gas, such as air, under pressure to compensate volumetric differences between the rebound chamber 11 and the compression chamber 12 induced by the presence of the piston rod 5 in the rebound chamber 11. Since the volume of the piston rod 5 is relatively large, it should be appreciated that the functionality of the compensation chamber 13a can be provided by a reservoir that is external to the main tube 3.

According to an embodiment of the present invention, the main piston 4 can be provided with rebound and compression valves 41, 42. The rebound and compression valves 41, 42 can comprise stacks of deflectable or floating discs, optionally biased by springs, for controlling the flow of working fluid through the main piston 4 between the rebound chamber 11 and the compression chamber 12 in response to an axial movement of the main piston 4 along the center axis A.

The piston rod 5, a secondary piston 6 and a rebound stop 8 can have a similar structure as illustrated in FIGS. 2-4. The piston rod 5 includes an extender 53, a cylindrical body 52, and a mounting projection (not shown). The cylindrical body 52 extends along the center axis A and defines an annular chamber 55, 56, 57. One end of the cylindrical body 52 is located in the fluid chamber 11, 12 while another end of the cylindrical body 52 is located outside the fluid chamber 11, 12. The mounting projection (not shown) couples to another end of the piston rod 5 located outside the fluid chamber 11, 12 and is configured for coupling piston rod 5 to the top mount 102. The extender 53 couples to the one end of the cylindrical body 52 wherein the extender 53 connects the piston rod 5 with the main piston 4, which is secured on a threaded projection 531 of the extender 53 by a nut 43. The annular chamber 55, 56, 57 extends between the extender 53 and the mounting projection (not shown). A slidable partition 54, having a generally cylindrical shape, provided with a sealing 541, is disposed in the annular chamber 55, 56, 57 dividing the annular chamber 55, 56, 57 into a magnetorheological ("MR") chamber 55, 56, proximal to the main piston 4, and a compensation chamber 57, distal to the main piston 4. According to an embodiment of the present invention, the compensation chamber 57 can be in fluid communication a reservoir external with respect to the piston rod 5 and/or the main tube 3.

The secondary piston 6 is slidably disposed inside the MR chamber 55, 56, dividing the MR chamber 55, 56 into a MR compression chamber 55 and a MR rebound chamber 56. The MR compression chamber 55 is distal relative to the main piston 4 and extends between the slidable partition 54 and the secondary piston 6. The MR rebound chamber 56 is proximal relative to the main piston 4 and extends between the secondary piston 6 and the main piston 4. The secondary piston 6 couples to a secondary piston rod 9 having a cylindrical body 95. The secondary piston rod 9 is sealingly and slidably guided through the main piston 4, through the extender 53 of the piston rod 5.

A partitioning member 93 is located in the compression chamber 12 and coupled to the main tube 3. For example, the partitioning member 93 can define an annular groove (not shown) and the main tube 3 may be clenched from outside to the inside of this groove to fixate the axial position of the partitioning member 93. The partitioning member 93 is provided with a number of, preferably equiangularly spaced, axial openings 94 enabling a relatively unobstructed flow of working fluid in the compression chamber 12. The cylindrical body 95 of the secondary piston rod 9 can be provided with a threaded, narrowed end which passes through the partition 93 and is secured at the other side by a nut 92 abutting a washer 96. Thus, similarly as in the embodiment shown in FIG. 1 the axial position of the secondary piston 6 with respect to the main tube 3 is affixed. The electromagnetic coils 64 of the secondary piston 6 are similar to the electromagnetic coils 64 shown in FIG. 3 which is in electrical communication with a control cable 91 passing through the cylindrical body 95 of the secondary piston rod 9. The control cable 91 extends to the outside of the damper assembly 1a thorough a sealed opening in the main tube 3 in a compression chamber 12 between the partitioning member 93 and the slidable partition 7a.

Figure 6:
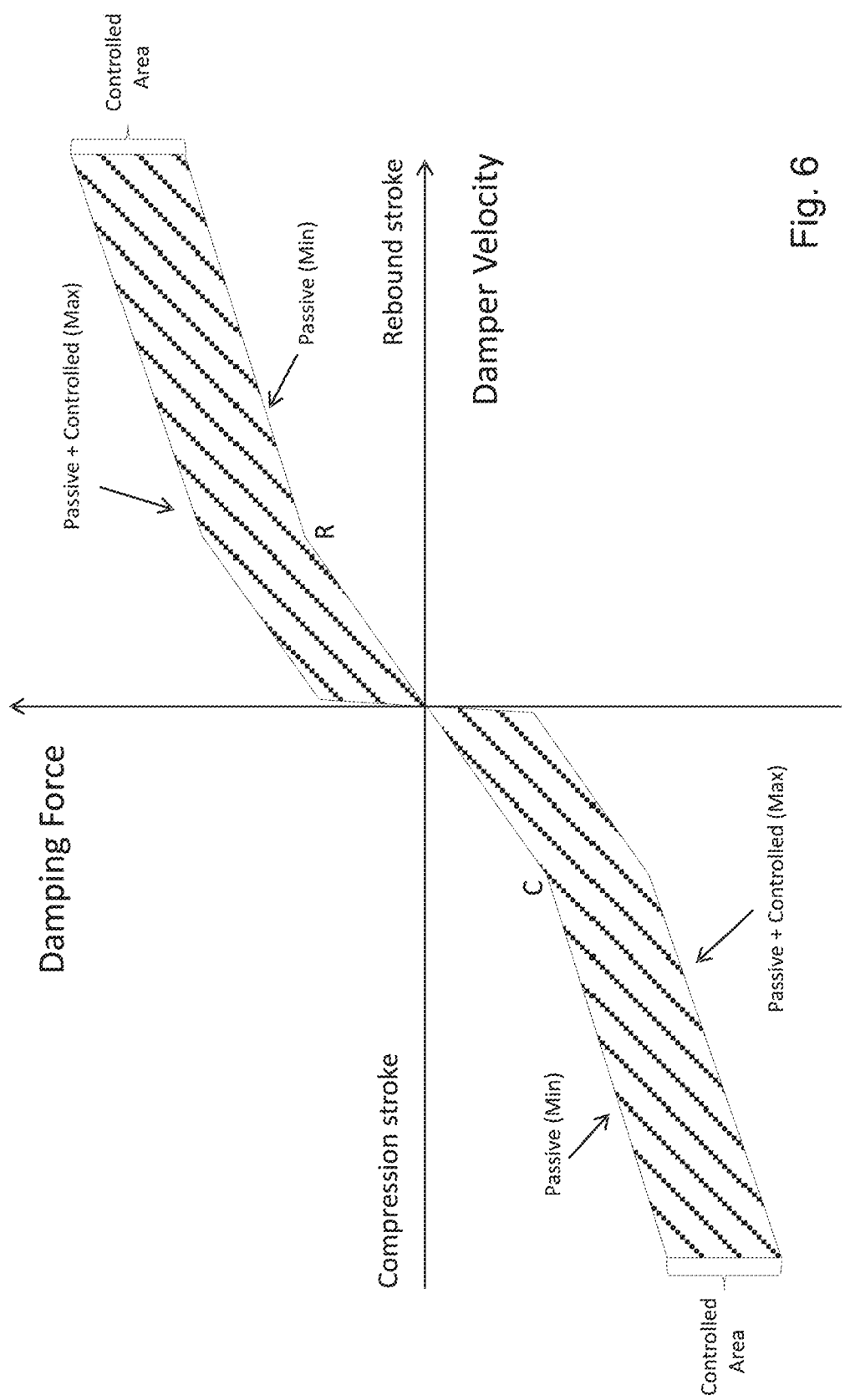
FIG. 6 is a graphical illustration for an exemplary force to velocity characteristic of the damper according to the present invention.

An exemplary force to velocity characteristic of the twin-tube damper according to the present invention is illustrated in FIG. 6. As illustrated in FIG. 6, the main piston 4 provides digressive characteristic of the damping force in a passive, de-energised mode of the secondary piston 6, with distinguishable kink points C, R resulting from blow-off features of the rebound and compression valve 41, 42 of the main piston 4. In dependence on the detected road conditions, for example, and the implemented control algorithm, the electromagnetic coils 64 of the secondary piston 6 may be energized at any time in a continuous manner, correspondingly affecting continuous change of the viscosity of the MR fluid and thus the damping generated in the flow channel 63 of the secondary piston 6. Any damping force within the hatched controlled area can be achieved up to the level, where the viscosity of the damping fluid flowing through the flow channel 63 reaches its maximum.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A damper assembly comprising:
    a main tube extending along a center axis defining a fluid chamber for containing a working fluid;
    a main piston located in said main tube dividing said fluid chamber into a compression chamber and a rebound chamber;
    a piston rod extending into said main tube through a piston rod guide and coupled to said main piston for moving said main piston between a compression stroke and a rebound stroke, said piston rod defining an annular chamber extending along said center axis;
    a slidable partition located in said annular chamber dividing said annular chamber into a magnetorheological chamber and a compensation chamber, said magnetorheological chamber being proximal relative to said main piston for containing a magnetorheoligial fluid, said compensation chamber being distal relative to said main piston for containing a gas;
    a secondary piston slidably disposed in said magnetorheological chamber dividing said magnetorheological chamber into a magnetorheological compression chamber and a magnetorheological rebound chamber, said magnetorheological compression chamber extending between said slidable partition and said secondary piston, said magnetorheological rebound chamber extending between said secondary piston and said main piston; and
    a secondary piston rod sealingly and slidably guided through said main piston and coupled to said main tube for moving said secondary piston axially in said magnetorheological chamber.

2. The damper assembly according to claim 1, wherein said secondary piston includes at least one flow channel;
    at least one electromagnet coil adapted for variably generating a magnetic flux to modify shear resistance of the magnetorheological fluid to control the flow of magnetorheological fluid passing through said least one flow channel; and
    a control cable coupled to said at least one electromagnet coil and passing through said secondary piston rod and led outside said main tube.

3. The damper assembly according to claim 1 further including:
    an external tube extending about said main tube defining an additional compensation chamber extending between said main tube and said external tube; and
    a base valve located at an end of said compression chamber, said base valve being provided with rebound and compression valves for controlling working fluid flow passing between said compression chamber and said additional compensation chamber;
    wherein said secondary piston rod is coupled to said base valve or said external tube.

4. The damper assembly according to claim 1 further including:
    a gas cup located in said compression chamber and adjacent to a closed end of said main tube to define a gas chamber extending between said closed end and said gas cup for containing a gas; and
    a partitioning member located in said compression chamber and coupled to said main tube, said secondary piston rod being coupled to said partitioning member.

5. The damper assembly according to claim 1, wherein said compensation chamber is in fluid communication with a reservoir external with respect to said main tube.

6. The damper assembly according to claim 1, wherein said magnetorheological rebound chamber has a non-zero volume in a maximal extension state of the damper assembly.

7. The damper assembly according to claim 1 further include a rebound stop located in said rebound chamber and coupled to said piston rod.

8. The damper assembly according to claim 1, wherein said main piston includes a compression valve and a rebound valve; and
    wherein said rebound valve or said compression valve of said main piston provide digressive characteristic of the damping force with respect to a velocity of said main piston.

9. The damper assembly according to claim 1, wherein one end of said piston rod couples to said main piston and another end of said piston rod includes an inlet valve, said inlet valve being in fluid communication with said compensation chamber for filing said compensation chamber with gas.

10. The damper assembly according to claim 1, wherein said piston rod includes an extender, a cylindrical body, and a mounting projection;
   wherein said cylindrical body defines said annular chamber extending along said center axis;
   wherein one end of said cylindrical body is located in said fluid chamber, said extender being coupled to said one end and said main piston to secure said main piston to said cylindrical body;
   wherein another end of said cylindrical body is located outside said fluid chamber, said mounting projection being coupled to said another end of said cylindrical body.

11. The damper assembly according to claim 10, wherein said mounting projection includes a valve, said valve being in fluid communication with said compensation chamber for filing said compensation chamber with gas.

12. The damper assembly according to claim 1, wherein said piston rod includes an extender, a cylindrical body, and a mounting projection;
   wherein said cylindrical body defines said annular chamber extending along said center axis;
   wherein one end of said cylindrical body is located in said fluid chamber, said extender being coupled to said one end and said main piston to secure said main piston to said cylindrical body;
   wherein another end of said cylindrical body is located outside said fluid chamber, said mounting projection being coupled to said another end of said cylindrical body.

13. The damper assembly according to claim 12, wherein said mounting projection includes a valve, said valve being in fluid communication with said compensation chamber for filing said compensation chamber with gas.

14. A damper assembly comprising:
   a main tube extending along a center axis defining a fluid chamber for containing a working fluid;
   a main piston located in said main tube dividing said fluid chamber into a compression chamber and a rebound chamber;
   a piston rod extending into said main tube through a piston rod guide and coupled to said main piston for moving said main piston between a compression stroke and a rebound stroke, said piston rod defining an annular chamber extending along said center axis;
   a slidable partition located in said annular chamber dividing said annular chamber into a magnetorheological chamber and a compensation chamber, said magnetorheological chamber being proximal relative to said main piston for containing a magnetorheologial fluid, said compensation chamber being distal relative to said main piston for containing a gas;
   a secondary piston slidably disposed in said magnetorheological chamber dividing said magnetorheological chamber into a magnetorheological compression chamber and a magnetorheological rebound chamber, said magnetorheological compression chamber extending between said slidable partition and said secondary piston, said magnetorheological rebound chamber extending between said secondary piston and said main piston;
   a secondary piston rod sealingly and slidably guided through said main piston and coupled to said main tube for moving said secondary piston axially in said magnetorheological chamber;
   an external tube extending about said main tube defining an additional compensation chamber extending between said main tube and said external tube; and
   a base valve located at an end of said compression chamber, said base valve being provided with rebound and compression valves for controlling working fluid flow passing between said compression chamber and said additional compensation chamber;
   wherein said secondary piston rod is coupled to said base valve or said external tube.

15. The damper assembly according to claim 14, wherein said secondary piston includes at least one flow channel;
   at least one electromagnet coil adapted for variably generating a magnetic flux to modify shear resistance of the magnetorheological fluid to control the flow of magnetorheological fluid passing through said least one flow channel; and
   a control cable coupled to said at least one electromagnet coil and passing through said secondary piston rod and led outside said main tube.

16. The damper assembly according to claim 14, wherein said main piston includes a compression valve and a rebound valve; and
   wherein said rebound valve or said compression valve of said main piston provide digressive characteristic of the damping force with respect to a velocity of said main piston.

17. The damper assembly according to claim 14, wherein said magnetorheological rebound chamber has a non-zero volume in a maximal extension state of the damper assembly.

18. The damper assembly according to claim 14, wherein said compensation chamber is in fluid communication with a reservoir external with respect to said main tube.

19. The damper assembly according to claim 14 further include a rebound stop located in said rebound chamber and coupled to said piston rod.

20. The damper assembly according to claim 14, wherein one end of said piston rod couples to said main piston and another end of said piston rod includes an inlet valve, said inlet valve being in fluid communication with said compensation chamber for filing said compensation chamber with gas.

* * * * *